United States Patent [19]
Vogel

[11] 4,026,161
[45] May 31, 1977

[54] VARIABLE SPEED TRANSMISSION AND ACTUATOR THEREFOR

[76] Inventor: Hilmar Vogel, Gartenstrasse 1E, Krailling, Germany, 8033

[22] Filed: Apr. 12, 1976

[21] Appl. No.: 675,904

Related U.S. Application Data

[63] Continuation-in-part of Ser. No. 482,633, June 24, 1974, abandoned.

[52] U.S. Cl. .......................................... 74/230.17 M
[51] Int. Cl. ............................ F16h 9/00; F16h 9/18
[58] Field of Search .......... 74/230.17 M, 230.17 B, 74/230.17 C

[56] References Cited

UNITED STATES PATENTS

| | | | |
|---|---|---|---|
| 2,711,103 | 6/1955 | Miner | 74/230.17 M |
| 3,699,827 | 10/1972 | Vogel | 74/230.17 C |

FOREIGN PATENTS OR APPLICATIONS

| | | | |
|---|---|---|---|
| 1,032,633 | 6/1958 | Germany | 74/230.17 M |
| 1,117,352 | 11/1961 | Germany | 74/230.17 M |

Primary Examiner—Samuel Scott
Assistant Examiner—Allan R. Burke
Attorney, Agent, or Firm—Karl F. Ross; Herbert Dubno

[57] ABSTRACT

A variable-speed transmission has a pair of parallel shafts each carrying a two-part pulley of which one half only is axially displaceable along the shaft while the other is axially fixed thereto; both parts are rotatable relative to the shaft. A belt or chain spans the two pulleys and interconnects the two shafts rotationally together. A pressure ring is rotatable and axially shiftable on each side of the shaft to one axial side of the pulley and operatively engages the displaceable half of the respective pulley. A pair of operatively interconnected rigid levers lying to one axial side of the belt are each pivoted on a respective pressure ring and on the housing and the two levers are directly connected together so that they can operate to displace one of the pulley halves in one axial direction while displacing the other in the opposite direction and vice versa. Means is provided on at least one of the pulleys to press the displaceable half thereof towards the other with a force proportional to the torque exerted on the respective pulley. The axial actuator for this displaceable pulley half comprises a sleeve on the shaft forming a radially open seat and having an inner wall formed as a surface of revolution with a radial axis. A pair of segments in the seat are disposed to either side of a plane passing through the axis and each have a curved outer surface slidable around the inner wall of the seat and a generally planar inner surface tangentially engaging a radial pressure pin. The pin is axially shiftable by the respective pressure ring of the pulley along the shaft with which it is entrained. Links are each pivoted at one end on the shaft and at the other end on a respective pressure segment. These links lie at an angle to a symmetry plane extending through the axis of the respective shaft and the axis of the pressure pin. Thus the axial position of the sleeve on the shaft determines the position of the segments in the seat and therefore establishes the angle of attack of the pin on the segments.

5 Claims, 5 Drawing Figures

VARIABLE SPEED TRANSMISSION AND ACTUATOR THEREFOR

CROSS-REFERENCE TO RELATED APPLICATION

The present application is a continutaion-in-part of Ser. No. 482,633 filed June 24, 1974, now abandoned.

FIELD OF THE INVENTION

The present invention relates to a steplessly variable transmission. More particularly this invention concerns a variable pitch pulley.

BACKGROUND OF THE INVENTION

There is known a variable-speed drive having a pair of variable-pitch pulleys carried on parallel shafts, one of which serves as the input or driven shaft the other of which serves as the output or drive shaft. Each of the pulleys has a pair of side menbers which are displaceable relative to each other so as to allow an endless belt, chain or the like spanned between these two pulleys to be guided at each pulley around a path having a radius of curvature which is determined by the axial spacing of the two side members of the pulleys. A linkage is provided which simultaneously draws the two members of one pulley axially away from each other while drawing the two members of the other pulley toward each other and vice versa so that given, for instance, a constant input speed of one of the shafts, the other shaft will be rotated at a greater or lesser speed.

The linkage which displaces the sides of the pulleys is frequently very complicated and occupies a considerable amount of space to both sides of the belt spanning the pulleys. In addition in such systems it is relatively difficult to provide means for automatically tightening the belt as they or the belt wear.

It is also known, as disclosed in my U.S. Pat. No. 3,699,827 of Oct. 24, 1972 to provide such a transmission with an axial actuator wherein the adjustable element of each pulley is pressed toward the other pulley with a force proportional to the torque exerted on that pulley by the belt. Such an arrangement comprises a pair of segments received within a cylindrical and radially extending seat formed in a sleeve carrying the adjustable pulley member and having an inner flat surface engageable tangentially with a radially extending pin carried on the respective pulley shaft. The position of these segments within the seat determines the angle of the attack of the pressure pin against these segments and, therefore, determines the magnitude of the component of force transmitted axially to the displaceable pulley member.

When such an arrangement is added to the already complicated transmission structure with its complex linkage extending to both axial sides of the coupling belt, the cost of the transmission is raised considerably. It has also been noted that with such a transmission having pulley or sheath members which are biased together with a force proportional to the torque exerted on them, the element which adjusts the shoes or segments wears rapidly. This problem is particularly present when the two sheave elements are used with a drive chain tending to exert a force on the pulleys that varies radically.

Objects of the Invention

It is therefore an object of the present invention to provide an improved steplessly variable transmission.

Yet another object is the provision of an improved variable-pitch pulley or sheave which overcomes the above-given disadvantages.

A further object is the provision of such a drive which advances principles laid forth in my above-mentioned patent.

Another object of the invention is to provide a variable-speed transmission which advances the principles set forth in application Ser. No. 482,633 mentioned above.

Summary of the Invention

These objects are attained according to the present invention in a steplessly variable transmission comprising a pair of shafts having and rotatable about parallel axes fixed relative to one another.

Each shaft carries a fixed sheave half of which is fixed axially to the shaft and a displaceable sheave half which is fixed rotationally to the fixed sheave half but is axially shiftable toward and away from this sheave half.

An endless coupling element such as a belt, chain or the like is engaged between sheaves formed by the fixed and displaceable sheave half on each shaft so as to rotationally interconnect the two shafts. A pressure ring rotatable and axially shiftable on each of the shafts to one axial side of the endless coupling element is operatively engaged with a displaceable sheave half.

A plurality of operatively interconnected rigid links to one axial side of the endless coupling element are each pivoted on the housing of the transmission and on a respective pressure ring so that means connected to the links and therethrough to the pressure rings is operable for simultaneous displacement of one of the displaceable halves towards its respective fixed half and the other of the displaceable halves away from the respective fixed half and vice versa. Means are also provided between at least one of the pressure rings and the respective coupling member for pressing same axially against the endless coupling element with force proportional to the torque exerted by the coupling element on the respective sheave.

Thus in accordance with the present invention a lever linkage located entirely to one side of the coupling element and operating through the torque-responsive means serves to vary the input/output speed ratio of the transmission.

In accordance with yet another feature of this invention the torque-responsive means comprises an axial actuator comprising a sleeve on one of the sheave halves surrounding and formed with a radially open seat having an inner wall formed as a surface of revolution with a radial axis. This sleeve and the sheave half attached to it are rotationally coupled to the shaft but axially shiftable therealong. The pressure ring engages another ring carrying a generally radial pressure pin axially displaceable on the shaft relative to the sleeve and received in the socket. A pair of pressure segments or shoes are received in the seat and are disposed on either side of a plane passing through the shaft and pin axis. Each such segment has a curved outer surface slidable around the inner wall of the seat and a generally planar inner surface tangentially engaging the pin. A pair of rigid links are each pivoted at one end of the shaft and at the other end on a respective pressure segment. These links lie at an angle to the above-mentioned plane and extended generally axially, with the segments and the links symmetrical to either side of this plane. Thus the axial position of the sleeve on the shaft determines the position of the segments in the seat and therefore establishes the angle of attack of the pin on the segments and the amount of rotational force converted into axial force exerted on the coupling element.

Such an arrangement is virtually foolproof in that the rigid links serve to displace the shoes or segments and are subject to practically no wear. It has been found even after very long use the critical parts of a transmission so made are in virtually perfect condition.

In accordance with yet another feature of this invention the shaft is provided with a separate pivot for each of the links or with a pivot for both of the links. In the former case the links cross each other whereas in the latter case this single pivot is located on the above-mentioned symmetry plane.

According to this invention a pair of levers are each pivoted on the housing each connected at their outer ends to a respective pressure ring and pivoted together at their inner ends so that when the common pivot is displaced the both pressure rings are displaced axially in the same direction. The sheaves in such a system are arranged with the fixed member of the one sheave and the displaceable member of the other sheave to one axial side of the coupling element and the displaceable member of the one sheave and the fixed member of the other sheave to the other side of the coupling element so that pressure rings will be effective to move the one displaceable member in one axial directin and the other displaceable member in the opposite direction.

According to yet another feature of this invention one of the levers is carried on a pivot which is displaceable on the housing and is biased by a spring into a position tending to urge the respective pressure ring with a predetermined biasing force in a direction tending to press its displaceable sheave member toward the respective fixed sheave member. This biasing arrangement can comprise a pivot pin threaded into a rotatable pivot nut rotationally biased by a torque spring carried on the transmission housing.

Since the two pulley halves are rotatable relative to the shaft and the ring carrying the pin which acts upon the segments is keyed to the shaft, i.e., rotatable therewith but axially movable therealong, the torque transmission from the shaft to the sheave (when the shaft is driven and the sheave is connected by a belt load) is effected through the key between the ring and the shaft, thence through the radial pin or pins on this ring and any roller which may be provided on the pin, then to the segment between this pin and the sleeve of the axially movable pulley half in the sense of rotation of the shaft, then to the seat in which this segment is slidable and the sleeve which forms this seat, and thus to the axially movable pulley half which, in turn, is keyed to the axially stationary first pulley half and the belt. Since the angle of attack of the pin on the segment will change as described above, the circumferential force component and the axial force component will depend upon the position of the segment in the seat about the radial axis of the pressure pins. This is what automatically produces an additional axial force with high shaft load and low incoming belt torque situation.

Conversely, when the pulley is driven by the belt and the shaft is connected to the load, torque transmission between the pulley, both of whose halves are rotatable relative to the shaft to the limited degree allowed by the pressure pins, is effected by the wall of the seat facing in the direction of rotation of the pulley, the respective segment, the pressure pin engaged by that segment, the ring to which the pressure pin is affixed, and the keying arrangement by which the pressure ring is mounted on the shaft.

In either case, depending upon the sense of rotation of the driven part (i.e., the shaft or pulley), one segment of each pair functions as an incompressible torque-transmitting member and as a means for transforming the torque into an axial force component which, applied through the length, holds the pulley halves together with any requisite axial force.

BRIEF DESCRIPTION OF THE DRAWING

The above and other objects, features and advantages will become more readily apparent from the following, reference being made to the accompanying drawing, in which.

SPECIFIC DESCRIPTION

Figure 1:
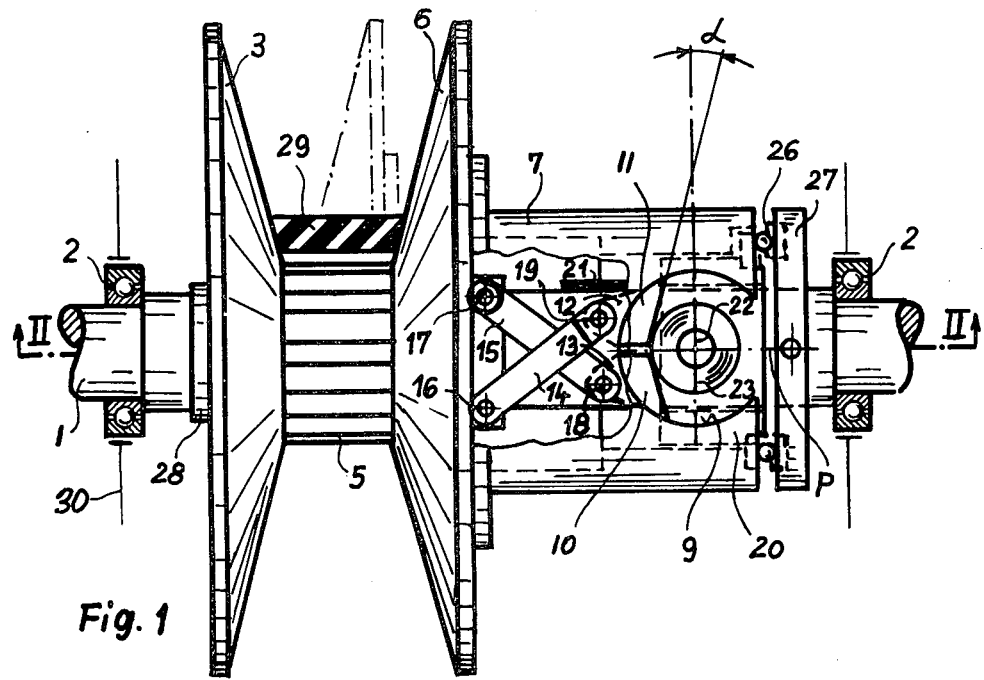
FIG. 1 is a side, partly sectional view of a variable-pitch pulley according to the present invention.
Figure 2:
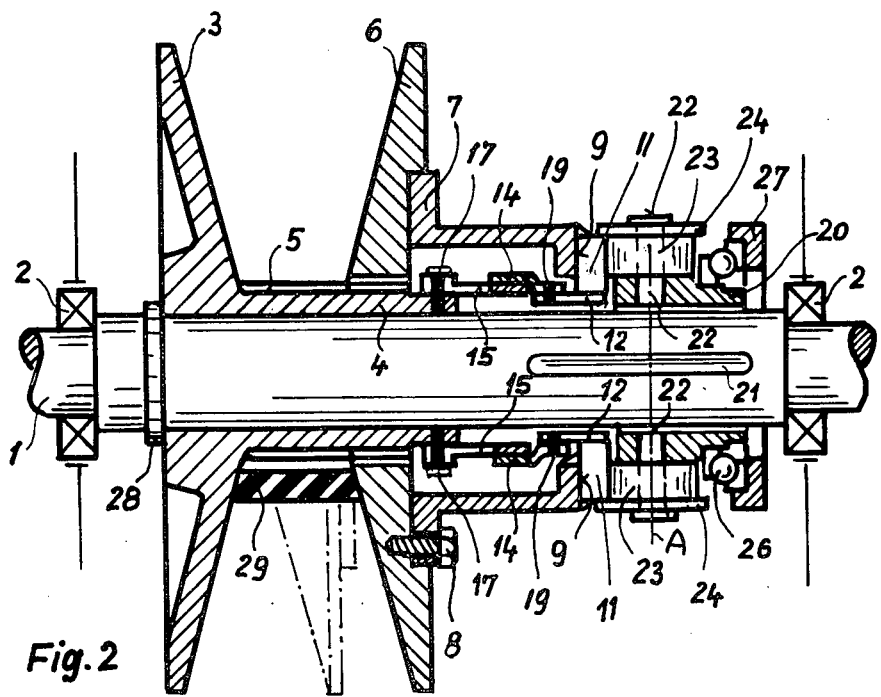
FIG. 2 is a section taken along line II—II of FIG. 1.
Figure 3:
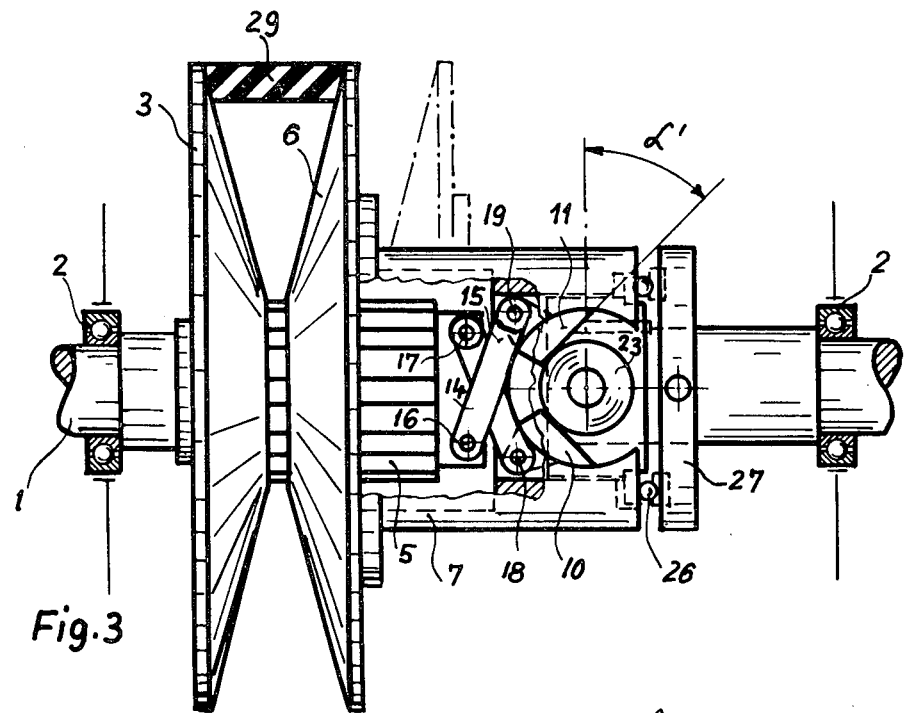
FIG. 3 is a view similar to FIG. 1 illustrating the pulley in another operative position.

As shown in FIGS. 1 to 3, a shaft 1 having an axis is journaled in a housing 30 in a pair of roller bearings 2. An axially fixed frustoconical sheave half 3 bears against a snap ring 28 fitted into the shaft 1 and has a sleeve-like hub 4 formed with splines 5 fitting into similar formations on a facing frustoconical sheave half 6. The half 3 is fixed axially on the shaft 1 and the half 6 is axially displaceable thereon between the two positions shown in solid and dot-dash lines in FIG. 1, the solid-line position corresponding to minimum pitch diameter and the dot-dash line position corresponding to maximum pitch diameter. However both halves 3 and 6 are rotatable relative to the shaft. Screws 8 (FIG. 2) secures the half 6 to a sleeve-like hub 7 formed with a cylindrical outwardly opening seat 9 having a central radial axis A. A pressure ring 27, which is rotatable about the shaft 1 and axially shiftable therealong by means of a fork described below bears through a thrust bearing 26 on an adjustment ring 20 (FIG. 1) provided with a pair of diametrically opposite pins 22 lying on the axis A and provided with respective rollers 23 of cylindrical shape centered in the seat 9.

a pair of segments or shoes 10 and 11, as described in my above-mentioned patents, have arcuate outer surfaces slidable along the seat 9 and planar inner surfaces tangentially engageable with the roller 23. Each of these shoes 10 and 11 is formed with a respective ear 12 and 13 carrying a respective pivot 19 and 18. Rigid steel links 14 and 15 extend straight between the pivots 18 and 19 and pivots 16 and 17 on the sleeve hub of the pulley member 3. The link 14 is bent to clear the link 15 (FIG. 2). A washer 24 carried on each of the pins 22 prevents the roller 23 and the shoes 10 and 11 from being thrown centrifugally out of the apparatus.

The pulley according to the present invention functions as follows:

when the belt 29 is to ride at a minimum pitch diameter on the pulley as shown in solid lines in FIGS. 1 and 2 the pivots 16 and 17 are spaced at a maximum distance from the pivots 18 and 19 so that the shoes 10 and 11 are drawn as close as possible to a symmetry plane P including the axis A and A'. In this position the angle of attack α of the roller 23 on the inner surface of the shoes 10 and 11 is equal to between 15° and 20°, here approximately 18°.

As will be apparent from the drawing, the key 21 secures the pressure ring 20 to the shaft 1 upon which the pulley halves 3 and 6 are free to rotate, although the pulley half 3 is axially fixed by member 28 and pulley half 2 is keyed by splines 5 so as to move only axially relative to pulley half 3. Thus, assuming that the belt 29 is loaded and the shaft 1 is driven to rotate the shaft 1 in the clockwise sense as seen from the right-hand end, the key 21 transmits torque to the ring 20 whose rollers 23 bear upon the segments 11 to press the latter against the upper part of the seat 9. The sleeve 7 is caused to rotate in the same sense and splines 5 transmit the torque to the other pulley half 3 and thence to the belt 29. The axial component of the force is applied through the links 14 and 15 to reinforce the forces preventing separation of the pulleys.

If the shaft is rotated in the opposite sense, segment 10 is effective for torque transmission and the same relationship of the parts ensues. When the pulley 3, 6 is driven in the clockwise sense as defined above, the lower portion of its seat 9 bears upon segment 10 which applies torque to the roller 23 of pin 22 and thus to the ring 20. The latter, being keyed to the shaft at 21, entrains the shaft.

when the pressure ring 27 is displaced against the thrust bearing 26 so as to force the ring 20 toward the pulley half 3 the distance between pivots 16 and 17 and pivots 18 and 19 is decreased so that the segments 10, 11 are forced outwardly and the angle of attack is increased as shown in FIG. 3 to α', between 40° and 50°, here 45°. In this latter position, which corresponds to a maximum pitch diameter pulley 3, 6, the rotational force of the shaft 1 is transformed half into an axial component effective to hold the two halves 3 and 6 together half into a rotation component to rotate the pulley. In the minimum-diameter position shown in FIGS. 1 and 2 the axial component is increased considerably so as tightly to hold the belt 29.

Figure 4:
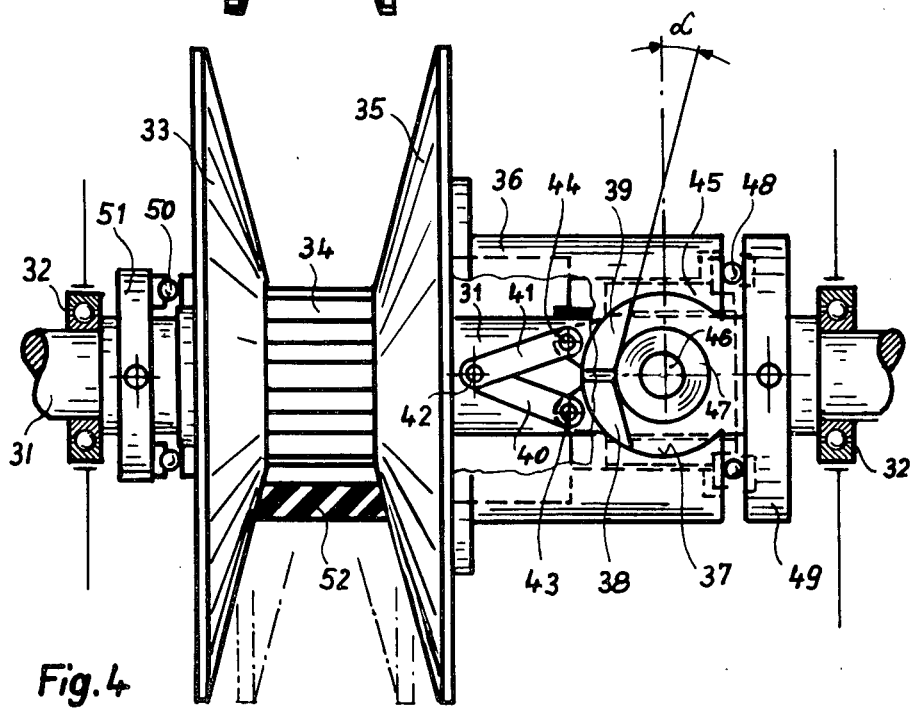
FIG. 4 is a view similar to FIG. 1 illustrating another pulley in accordance with the present invention.

The arrangement of FIG. 4 has a shaft 31 carried in two bearings 32 and on which is slidable a pulley half 33 having a splined hub 34 engageable with the pulley half 35 so as to rotationally link the two together. A hub 36 of the pulley half 35 is formed with a cylindrical radially extending seat 37 which half segments 38 and 39 operated by rigid links 40 and 41 attached at one end at a single pivot 42 which is secured in the shaft 31 and at the other ends at pivots 43 and 44 on ears carried on the segments 38 and 39. A pressure ring 49 bears via a thrust bearing 48 on a ring 45 carrying a pressure pin 46 on which is mounted the pressure roller 47 that engages the planar inner surface of the segments 38 and 39. The rings 45 and hub 34 are keyed to the shaft 31.

Thus displacement of the pressure ring 49 to the left as shown in FIG. 4 presses the ring 45 to transmit axial force via the roller 47 and segments 38 and 39 to the seat 37, thereby displacing the hub 36 to the left and increasing the pitch diameter of the pulley 33, 35. As the pitch diameter is increased the angle α will also be increased as described above with reference to FIGS. 1-3.

FIG. 4 also shows how the pulley half 33 can be axially displaceable on the shaft 1 by means of a pressure ring 51 and a thrust bearing 50 so as to allow both sides of this pulley 33, 35 to be adjusted for determining the pitch diameter 52. The two pressure rings 49 and 51 can be operated simultaneously or independently. In particular it is possible to provide a spring between the ring 51 and the housing of the transmission to function as a belt tightener.

The system of FIG. 4, of course, operates similarly in that the ring carrying pin 46 and roller 47 is keyed to the shaft 1 so as to be axially displaceable therealong but rotatably entrained with the shaft. The pulley halves 33 and 35, of course, are rotatable relative to the shaft but are totatably entrained with one another by the splines 34. The system thus operates similarly to that of FIG. 1.

Figure 5:
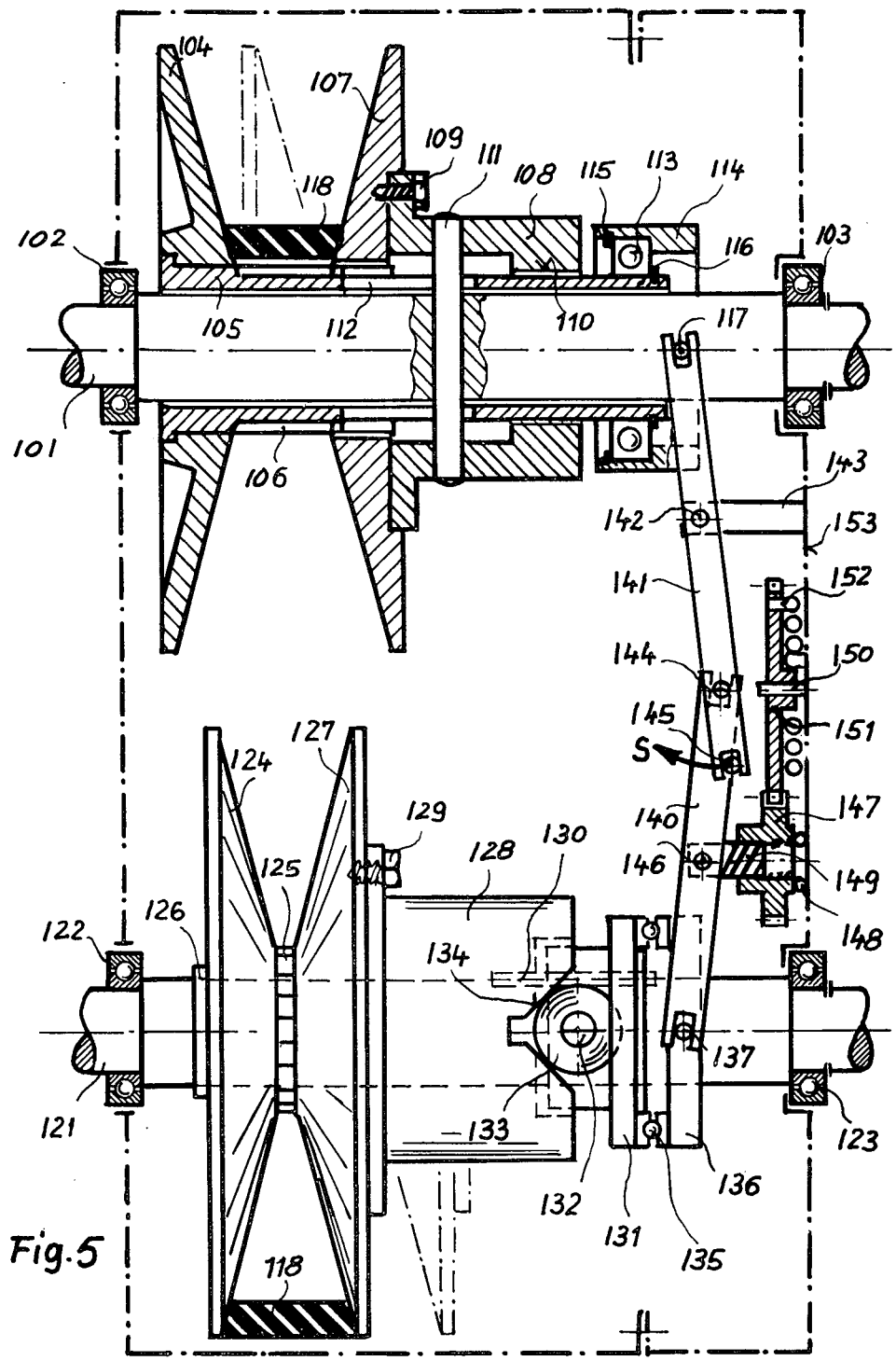
FIG. 5 is a side view partly in section illustrating a transmission according to the present invention.

The transmission shown in FIG. 5 has an input shaft 101 carried on bearings 102 and 103 in a housing 153. The pulley half 104 is provided with a sleeve-like hub 105 journaled on the shaft 101 and connected via splines 106 to a pulley half 107 secured via screws 109 to its hub 108. A diametrically throughgoing pin 111 traverses the shaft 101 and is secured in the hub 108 so as rotationally and axially to fix the pulley half 107 to this shaft 101, and simultaneously to rotationally secure the half 104 via the splines 106 to the shaft 101. the hub 105 of the pulley half 104 is formed with an elongated slot 112 through which the pin 111 passes so as to allow displacement of the half 104 on the shaft 101. The end of this sleeve hub 105 to the right-hand side of a coupling element 118 shown in FIG. 5 is provided with a snap ring against which is engaged a thrust bearing 113 also engaging a snap ring 114 in a pressure ring 115 carrying a pair of diametrically oposite pins 117 engaged in the end of a fork 141. Thus it is possible for the fork to be displaced about its pivot 142 on a support member 143 secured to the housing 153 and pull the pulley half 104 toward the pulley half 107, the normal tendency of the belt 118 being to push the pulley halves 104 and 107 apart.

An output shaft 121 parallel to the input shaft 101 is journaled in the housing 153 in bearings 122 and 123 and carries a first pulley half 124 whose axial displacement on the shaft 121 is limited by a snap ring 126 and which is connected via splines 125 to another pulley half 127 in turn connected via screws 129 to its hub 128. A key 130 axially connects this shaft 121 to the hub 128, and also rotationally couples an adjustment ring 131 connected via a thrust bearing 135 to a nonrotatable pressure ring 136. The adjustment ring 131 is provided with a pressure pin 132 carrying a pressure roller 133 received between two surfaces 134 formed in the hub 128 extending at right angles to each other and at 45° to a plane passing through the axis of the shaft 121 and the axis of the pin 132. The torque-responsive arrangement 9–24 of FIGS. 1–3 could be used instead of the arrangement 32–34.

The pressure ring 136 is formed like the pressure ring 114 with a pair of diametrically oposite pins 137 engaged by a fork 140 pivotal at 146 and provided on its other end with another pivot 144 which also passes through the upper lever arm 141. A bowden cable, lever linkage or the like is connected at 145 to the end of the lever 141 so as to displace both of the pressure rings 136 and 144 simultaneously in the same axial directions, thereby displacing the diagonally opposite pulley members 127 and 104 in opposite axial directions.

The lever 140 is pivoted at 146 on a threaded bolt 149 received in a nut 147 carried via a bearing 148 on the housing 153. A wheel 151 is pivoted at 150 on the housing and is formed with teeth meshing with teeth on the nut 147. A large torsion spring 152 carried on the wheel 151 tends to rotate this wheel in a direction serving to rotate the nut 147 in a sense screwing the pin 149 out and maintaining a predetermined pressure on the pressure ring 136, so as to make up for wear in belt 118 spanning the two pulleys 104, 107 and 124, 127.

Since the entire operating mechanism 140–147 is located to one axial side of the element 118 spanning the two pulleys, the apparatus is extremely simple. In addition it is possible to mount the pulleys as near as possible to their bearings, thereby making a much more rigid assembly, and allowing the belt 118 to change readily.

It is within the scope of the present invention to combine the torque-responsive pulleys of FIGS. 1–4 with the actuating arrangement of FIG. 5.

I claim:
1. A variable-pitch sheave adapted to be mounted on a shaft having and rotatable about an axis, said sheave comprising:
   a first sheave half axially fixed to said shaft but rotatable thereon;
   a second displaceable sheave half axially shiftable on said shaft toward and away from said fixed sheave half and angularly fixed to said first sheave half;
   a sleeve carried on said displaceable sheave half and surrounding said shaft, said sleeve being formed with a seat having an inner wall formed as a surface of revolution with a generally radial axis;
   a generally radial pressure pin keyed to said shaft and centered in said seat;
   a pair of pressure segments in said seat disposed symmetrically to either side of a plane passing through said axis and longitudinally through said pin, each segment having a curved outer surface slidable around said inner wall and a generally planar inner surface tangentially engaging said pin;
   at least one pivot on said first sheave half; and
   a apir of rigid links each pivoted at one end at said pivot and at the other end on a respective pressure segment, said links lying at an angle to said plane and extending generally axially, said segments and said links being generally symmetrical to either side of said plane, whereby the axial position of said displaceable sheave half on said shaft determines the positions of said segments in said seat and therefore establishes the angle of attack of said pin on said segments.

2. The sheave defined in claim 1 wherein said shaft has a pair of such pivots, each of said links having an end pivoted on a respective pivot and said links crossing over one another at said plane.

3. The sheave defined in claim 1 wherein said pivot is located at said plane.

4. The sheave defined in claim 1 wherein said first sheave half has a sleeve-like hub extending through said displaceable sheave half and splined thereto, said pivot being provided on said hub between said pin and said displaceable sheave half.

5. The sheave defined in claim 1 wherein said surface of revolution is a cylinder.

* * * * *